[19] United States Patent
Panush

[11] Patent Number: 4,605,687
[45] Date of Patent: Aug. 12, 1986

[54] MULTILAYER AUTOMOTIVE PAINT SYSTEM

[75] Inventor: Sol Panush, Farmington Hills, Mich.

[73] Assignee: Inmont Corporation, Clifton, N.J.

[21] Appl. No.: 808,675

[22] Filed: Dec. 16, 1985

Related U.S. Application Data

[60] Continuation of Ser. No. 631,041, Jul. 16, 1984, abandoned, which is a division of Ser. No. 526,724, Aug. 26, 1983, Pat. No. 4,499,143.

[51] Int. Cl.$^4$ .................. C09D 5/29; B32B 19/02; C09C 1/62; C08K 9/10
[52] U.S. Cl. ..................................... 523/171; 523/210
[58] Field of Search ............................... 523/171, 210

[56] References Cited

U.S. PATENT DOCUMENTS

| | | | |
|---|---|---|---|
| 4,146,403 | 3/1979 | Armanini et al. | 523/171 |
| 4,344,987 | 8/1982 | Ostertag et al. | 106/308 B |
| 4,353,991 | 10/1982 | Ness et al. | 106/291 |
| 4,416,940 | 11/1983 | Love et al. | 428/324 |
| 4,436,377 | 3/1984 | Miller et al. | 428/363 |
| 4,472,479 | 9/1984 | Hayes et al. | 428/488.4 |

Primary Examiner—Herbert J. Lilling
Attorney, Agent, or Firm—Harry J. Gwinnell; Emil Richard Skula

[57] ABSTRACT

A transparent topcoat coating composition is described comprising a thermoplastic or thermosetting resin material containing low pigment to binder ratio of iron oxide encapsulated mica particles. When used in a multicoat coating process as a transparent topcoat, an article is produced which not only produces improved "metallic" color effects, but is stable to the elements as well.

1 Claim, 1 Drawing Figure

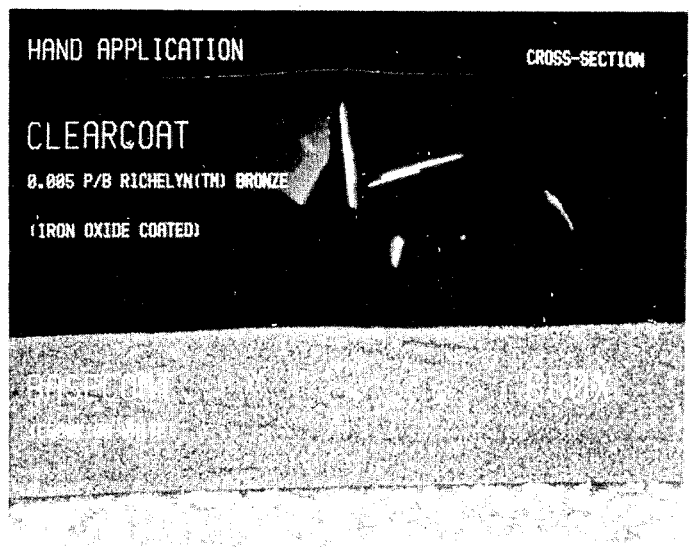

MULTILAYER AUTOMOTIVE PAINT SYSTEM

This application is a continuation of Ser. No. 631,041 filed July 16, 1984, now abandoned, which is a division of copending application Ser. No. 526,724, filed on Aug. 26, 1983, now U.S. Pat. No. 4,499,143.

DESCRIPTION

1. Technical Field

The field of art to which this invention pertains is coating compositions, coating methods, and the resultant coated articles.

2. Background Art

Multicoat coating systems are now well known in the coating industry. U.S. Pat. No. 3,639,147 describes such a system for use as an automotive paint. When multicoat coating systems have previously been applied, it has been difficult to obtain coatings having uniformly high gloss while at the same time maintaining good color, and pearlescent features.

In the automotive industry two significant systems are utilized in the painting of automobiles. One topcoat system which utilizes thermoplastic resins is known as the acrylic lacquer system. In this system the base polymers are the homopolymers of methyl methacrylate and copolymers of methyl methacrylate and acrylic acid, methacrylic acid, alkyl esters of acrylic acid or methacrylic acid, vinyl acetate, acrylonitrile, styrene and the like. The acrylic lacquer topcoats have been acknowledged to have outstanding aesthetic properties. Another outstanding topcoat system used in the automotive industry is the thermosetting acrylic resins as described in U.S. Pat. No. 3,375,227, issued March 26, 1968.

These topcoat systems have outstanding chemical resistance, outstanding resistance to cracking and crazing among other outstanding properties, but to the expert paint formulator, the thermosetting acrylic resins have not, in the past, quite provided the aesthetic properties obtained in the acrylic lacquer systems. In these systems a pigmented base coat composition is applied to the metal substrate to hide metallic blemishes and provide the aesthetically pleasing colors desired followed by the application of an unpigmented layer of polymer which imparts a "deep" color appearance to the base coat and durability to this pigmented base coat. This system, however, is not without its problems. Aesthetic quality of the coating is totally dependent on the application of the base coat. The clear topcoat magnifies any weakness in this base coat including the highlighting of any color deficiencies of the base coat. The clear coat also acts as a magnifying mirror for ultraviolet radiation which can accelerate rather than retard any degradation of the base coat due to exposure to ultraviolet radiation. In addition, many of these coating systems in use today utilize metal particles in the base coat to provide an aesthetically pleasing metallic appearance. However, problems have occurred with the use of metallic pigments resulting in color loss in the base coat.

In order to overcome the deficiencies of the metallic pigments, pearlescent pigments have been considered for use in the base coat, either with or in place of conventional pigments. However, use of these pigments have included such problems as moisture sensitivity, problems with large particle sizes, application control problems, problems with color travel (face to flop), sensitivity to sunlight, subtractive color effects, and quality control problems. Both with metallic pigments and with the many pearlescent pigments available problems such as ghosting, mottling, silking, alligatoring, telegraphing, etc. have also been observed. Use of a three coat system can correct some of these problems. However, this is not an acceptable solution in the industry. Additional coating steps can only aggravate already insurmountable application control problems.

Accordingly, what is needed in this art are improved coating compositions and coating systems which are aesthetically pleasing as well as durable and easy to control.

DISCLOSURE OF INVENTION

A coating composition is disclosed comprising a thermoplastic or thermosetting polymer composition containing iron oxide encapsulated mica particles in a pigment to binder ratio of about 0.0001 to 0.32 (weight ratio). The mica particles are about 5 to about 60 microns nominal longitudinal dimension and have a thickness of about 0.25 to about 1 micron. The encapsulating layer constitutes about 10% to about 85% by weight of the particle weight. The iron oxide layer can contain other constituents such as minor amounts of chromium hydroxide and titanium dioxide.

Another aspect of the invention includes a substrate material having coated thereon a multilayer coating system comprising at least one base coat and at least one topcoat. The base coat is a pigmented resin. The topcoat is a transparent thermoplastic or thermosetting material containing iron oxide encapsulated mica particles as described above.

Another aspect of the invention includes a method of coating a substrate by depositing a layer of the pigmented base coat and applying a layer of transparent thermoplastic or thermosetting iron oxide encapsulated mica containing polymer composition described above thereon.

By utilizing the compositions and processes of this invention, not only are truer, more brilliant "metallic" colors produced without the need for metal particles, but colors durable to the elements are produced as well.

The foregoing, and other features and advantages of the present invention, will become more apparent from the following description and accompanying drawing.

BRIEF DESCRIPTION OF THE DRAWING

The Figure shows in cross section a photomicrograph of an iron oxide encapsulated mica containing transparent topcoat according to the present invention.

BEST MODE FOR CARRYING OUT THE INVENTION

While any substrate material can be coated with the coating compositions according to the present invention, including such things as glass, ceramics, asbestos, wood, and even plastic material depending on the specific drying and/or curing requirements of the particular composition, the coating system of the present invention is particularly adapted for metal substrates, and specifically as an automotive paint finish system. The substrate may also be bare substrate material or can be conventionally primed, for example to impart corrosion resistance. Exemplary metal substrates include such things as steel, aluminum, copper, magnesium, alloys thereof, etc. The components of the composition can be varied to suit the temperature tolerance of the substrate material. For example, the components can be so constituted for air drying (i.e., ambient), low temperature cure (e.g., 150° F.–180° F.), or high temperature cure (e.g., over 180° F.).

The base coat material, i.e., the pigmented polymer layer closest to the substrate, comprises any suitable film forming material conventionally used in this art including acrylics, alkyds, polyurethanes, polyesters and aminoplast resins. Although the base coat can be deposited out of an aqueous carrier, it is preferred to use conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include from about 2% to about 50% by weight of a cellulose ester and/or wax (e.g., polyethylene) which facilitates quick release of the volatile organic solvent resulting in improved flow or leveling out of the coating. The cellulose esters used must be compatible with the particular resin systems selected and include such things as cellulose nitrate, cellulose propionate, cellulose butyrate, cellulose acetate butyrate, cellulose acetate propionate and mixtures thereof. The cellulose esters when used are preferably used in about 5% to about 20% by weight based on film forming solids.

The acrylic resins in the base coat may be either thermoplastic (acrylic lacquer systems) or thermosetting. Acrylic lacquers such as are described in U.S. Pat. No. 2,860,110 are one type of film forming composition useful according to this invention in the base coat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the base coat of this invention is a combination of a crosslinking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The crosslinking agents used in combination with the hydroxy-carboxy copolymers are those compositions which are reactive with hydroxy and/or carboxylic acid groups. Examples of such crosslinking agents are polyisocyanates (typically di- and/or tri-isocyanates) polyepoxides and aminoplast resins. Particularly preferred crosslinking agents are the aminoplast resins.

The polyisocyanates when reacted with hydroxyl bearing polyester or polyether or acrylic polymers will yield urethane films useful in the process of this invention in both the base coat and topcoat. The isocyanate (—NCO) —hydroxyl (—OH) reaction takes place readily at room temperature, so that ambient and low temperature cure is possible.

Among other base coats which are typically used in the processes of the present invention are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described crosslinking agents in the same weight ratios as are used with carboxy-hydroxy copolymers.

Included among the various fatty acids and oils useful in preparing these alkyd resins are the fatty acids derived from the following oils; castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1, 4 butanediol, hexylene glycol, 1,6 hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include mono-functional acids such as rosin acids, benzoic acid, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions such as are described in U.S. Pat. Nos. 3,050,412; 3,198,759; 3,232,903; 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor resistance, durability and mechanical properties. The monomers useful in preparing the above dispersed copolymers or homopolymers are those listed previously as useful in forming the carboxy-hydroxy acrylic copolymers.

In another instance the base coat film can be produced from resins known as polyesters or "oil-less" alkyd resins. These resins are prepared by condensing non-fatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Mono basic acids such as benzoic, para tertiary butyl benzoic and the like can also be utilized. Among the polyalcohols are the diols or glycols such as propylene glycol, ethylene glycol, butylene glycol, 1, 4 butanediol, neopentyl glycol, hexalene glycol, 1,6-hexanediol, and the like; the triols such as trimethylol ethane, trimethylol propane and glycerine and various other higher functional alcohols such as pentaerythritol.

Any of the above-recited polymers may be used as the topcoat, as long as it provides a transparent film. The term "transparent film" is defined as a film through which the base coat can be seen. It is preferred that the transparent film be substantially colorless so that the full polychromatic and aesthetic effect of the base coat is not substantially decreased. However, in some instances, desirable and unique styling effects can be obtained by the addition of contrasting or complementary colors to the topcoat. Another outstanding feature of the topcoat is the significant improvement in the durability which is provided to the overall coating composition.

The unique aesthetics of this system require the iron oxide encapsulated mica in the topcoat to be randomly located throughout the depth, width, and length of the clear film. In conjunction with the random distribution, the mica must also be oriented off both the vertical and horizontal axes. This distribution and orientation assures the visibility of the mica regardless of the viewing angle (90°, acute or obtuse). While this is in some degree a function of the particular coating method utilized, it is also a function of the size and constitution of the particle as described above. A Ransburg turbobell electrostatic sprayer is particularly suitable for applications of the transparent topcoat film containing the iron oxide encapsulated mica of the present invention.

The Figure which is a photomicrograph of a cross section of a coated substrate according to the present invention demonstrates some of the unique aspects of the coating system according to the present invention. The thin white line below the terms "Hand Application" and "Cross-Section" represents the top (outermost portion) of the iron oxide encapsulated mica containing transparent topcoat. The base coat is as marked and the substrate lies just below the base coat. The long white line segments in the topcoat ("Clearcoat") portion are the iron oxide encapsulated mica particles. The random orientation, uniform population distribution and lack of protrusion of the particles through the top of the transparent topcoat are demonstrated by the Figure and are all key factors which contribute to the improved properties of the transparent topcoat containing the iron oxide encapsulated mica particles.

Utilizing the compositions of the present invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat containing iron oxide encapsulated mica particles over a pigmented thermoplastic acrylic lacquer base coat (although acrylic lacquers may be used for both layers). Likewise, in appliance finishes the chemical resistance of polyester resins can be combined with the lower cost of thermosetting acrylic resins by applying a polyester clear topcoat containing iron oxide encapsulated mica particles over a pigmented thermosetting acrylic base coat. Although any of the above-mentioned thermoplastic materials may be used to form the transparent topcoat, better durability is achieved if the topcoat is one of the above-cited thermosetting materials, i.e., the material containing the crosslinking agents.

In all instances where the above methods and compositions are used extremely high gloss films result. In fact, where with normal two coat systems a 60° gloss in excess of 90-95 is difficult to obtain, using the process of this invention gloss readings in excess of 100 are readily obtained.

The iron oxide encapsulated mica pigments according to the present invention are commercially available from the Mearl Corporation and EM Chemicals, and range in color from golden bronze at the thinnest iron oxide encapsulation through copper, to red at the thickest iron oxide encapsulation. The iron oxide coatings on these pigments being transparent act as natural ultra-violet absorbers. For additional exterior durability (e.g., exposure to the sun) minor amounts of other additives such as chromium hydroxide and titanium dioxide may be included in the iron oxide encapsulation layer. It should also be noted that other high temperature stable metal oxides (such as copper, calcium, cadmium, cobalt, barium, strontium, manganese, magnesium and lithium) can be substituted in whole or in part for the encapsulating iron oxide. The iron oxide encapsulation layer is generally in the molecular range of thicknesses representing about 10% to about 85% by weight of the total weight of the encapsulated mica particle, preferably about 20% to about 60%, and typically about 29% to about 48% by weight. If additives such as titanium dioxide or chromium hydroxide are used as part of the encapsulation layer they are generally present in an amount of about 1% to about 35% by weight, and typically about 2% to about 5% for the titanium dioxide, and about 0.1% to about 3.5% by weight for the chromium hydroxide, based on total weight of the encapsulated particle.

The uniformity of shape (platelet) and smoothness of the iron oxide encapsulated mica pigment according to the present invention (e.g., as compared to the highly fragile, three dimensional and complicated configuration of aluminum flake, a standard in the automotive paint industry) eliminates the problem of color drift due to the shear forces (yielding fragmentation problems) in the handling (overhead pumping facilities) and application problems of ghosting, mottling, silkiness and repair color matching.

The iron oxide encapsulated mica pigments are optically pearlescent because their transparency permits light to pass through the particle resulting in a multiplicity of refractions and reflections. In addition to their pearlescence these pigments have inherent hiding capabilities, are additive colors and retain a metallic appearance (face to flop color travel). These features provide the capability of producing colors with depth, clarity and chromaticity not previously attainable with conventional metals (i.e., aluminum) and previous pearlescent pigments (natural or synthetic) which produced colors lacking depth and chromaticity or color travel due to the aesthetics of the metal component (aluminum) or pearl. These colorless and opaque pigments reduced the value (color intensity) of the "true" colored pigments be they organic or inorganic resulting in gray-cloudy-low chroma colors. The addition of the iron oxide encapsulated mica pigments provides hiding and depth to travel with the aesthetically pearlescent appearance.

The iron oxide encapsulated mica pigments are carefully screened and controlled particles, all within about 5 microns to about 60 microns (preferably about 5 microns to about 45 microns, and typically about 5 microns to about 35 microns) in their largest dimension, and about 0.25 micron to about 1.0 micron in thickness. The closely controlled particle size provides the transparent, translucent, reflective and refractive features establishing improved aesthetic and physical properties of these coatings through careful selection and blending of these pigments. In admixture with conventional colored pigments (organic or inorganic) or dyes (natural or synthetic) unique pearlescent colors can be produced. Blending complementary colors (e.g., red iron oxide encapsulated mica with red pigments or dyes) will produce deep chromatic colors while blending contrasting colors (e.g., bronze iron oxide encapsulated mica with red or blue pigments or dyes) will produce highly chromatic colors with unique undertones. Regardless of the selection, the final (clear coated) enamel will have improved color durability, greater moisture resistance and greater acid resistance than coatings prepared with conventional metals or synthetic pearls.

The amount of pigment in the base coat generally comprises about 1% to about 20% by weight, preferably about 7.5% to about 15% and typically about 10% by weight. About 5% to about 90% of this pigment can be iron oxide encapsulated mica according to the present invention, preferably about 25% to about 70% and typically about 60% by weight.

Both the base coat and the top coat can be applied by any conventional method in this art such as brushing, spraying, dipping, flow coating, etc. Typically spray application is used, especially for automotive finishing. Various types of spraying can be utilized such as compressed air spraying, electrostatic spraying, hot spraying techniques, airless spraying techniques etc. These can also be done by hand or by machine.

As stated above prior to application of the coating materials of the present invention a conventional corrosion resistant primer has already been applied. To this primed substrate is applied the base coat. The base coat is typically applied from about 0.4 mil to about 2.0 mil and preferably about 0.5 mil to about 0.8 mil. This thickness can be applied in a single coating pass or a plurality of passes with very brief drying ("flash") between applications of coats.

Once the base coat has been applied the transparent overcoat containing the iron oxide encapsulated mica particles is applied after allowing the base coat to flash at ambient temperature for about 30 seconds to about 10 minutes, preferably about 1 to about 3 minutes. While the base coat can be dried for longer periods of time, even at higher temperatures, a much improved product is produced by application of the transparent topcoat containing the iron oxide encapsulated mica particles after only a brief flash. Some drying out of the base coat is necessary to prevent total mixing of the base coat and topcoat. However, a minimal degree of base coat-topcoat interaction is desirable for improved bonding of the coatings. The topcoat is applied thicker than the base coat (preferably about 1.8 to 2.3 mils) and can also be applied in a single or multiple pass. It should also be noted that the iron oxide encapsulated mica pigments are applicable at low levels in the clear coat and in base coats with tinted clear topcoats. Both applications produce unique aesthetics while retaining the pearlescent appearance.

Pigment control is retained in the base coat while it is being overcoated. This is evidenced by lack of "strike-in" or migration of the two films (the base coat and topcoat) into each other. When "strike-in" occurs, pigments move from the base coat into the topcoat, the film compositions become intermixed at the interface and the baked coating composition has a dusty appearance rather than a clear "depth" appearance. By this invention substantially no "strike-in" occurs, and the coatings have outstanding clarity and depth. However, sufficient wetting takes place at the interface so that no problems of delamination and solvent release from either coating are obtained.

Once the topcoat is applied the system is again flashed for 30 seconds to 10 minutes and the total coatings are then baked at temperatures sufficient to drive off all of the solvent in the case of thermoplastic layers and at temperatures sufficient to cure and cross-link in the case of thermosetting layers. These temperatures can range anywhere from ambient temperature to about 400° F. Typically in the case of thermosetting material temperatures of about 225° F. to about 280° F. (e.g., 250° F.) are used, (e.g., for about 30 minutes).

The following examples are illustrative of the principles and practice of this invention although not limited thereto. Parts and percentages where used are parts and percentages by weight.

Three iron oxide encapsulated mica pigments are used in the following examples. The Golden Bronze Richelyn ™ (Inmont Corporation) pigment comprises 62%–68% mica, 29%–35% iron oxide, ($Fe_2O_3$), 3%–5% titanium dioxide ($TiO_2$) and 0.3%–0.9% chromium hydroxide ($Cr(OH)_3$). The Red Richelyn pigment comprises 49%–55% mica, 42%–48% iron oxide, 2%–4% titanium dioxide, and 0.3% to 0.9% chromium hydroxide. The Copper Richelyn pigment comprises 51%–57% mica, 40%–46% iron oxide, 3%–5% titanium dioxide and 0.3%–0.9% chromium hydroxide. All percents are by weight based on the total weight of the encapsulated pigment. The Golden Bronze Richelyn pigment contains a relatively thin layer of iron oxide encapsulation, the Red Richelyn pigment contains a relatively thick layer of iron oxide encapsulation, and the Copper Richelyn pigment contains a layer of iron oxide encapsulation which is somewhere in between.

EXAMPLE 1

A silver gray "metallic" base coat polymer composition was prepared by blending 144 parts of the copolymer formed by reacting 47 parts of butyl methacrylate, 37 parts of styrene, 15.75 parts of hydroxypropyl methacrylate and 0.25 part of methacrylic acid with 176 parts of xylene and butanol (in a weight ratio of 85/15). A pigment base was prepared by blending 99.77 parts of Rutile Titanium Dioxide with 0.22 part carbon black and 0.01 part Indanthrone Blue. This pigment base was blended with the base coat polymer composition in an amount representing 7.5% by weight of the composition to form the base coat paint composition.

Bonderized steel panels primed with a cured corrosion resistant primer were sprayed with the base coat paint composition to a film thickness of 0.6 mil on a dry film basis. After a flash of approximately 2 minutes at room temperature an additional 0.6 mil film of the base coat paint composition again as measured on a dry film basis was applied by spraying. After a 2 minute flash at room temperature, a transparent top coating containing Golden Bronze Richelyn pigment in a 0.001 pigment to binder ratio was applied by spraying to a film thickness on a dry basis of 2 mils. The transparent topcoating composition was prepared by blending 144 parts of the copolymer solution described above at 45 percent nonvolatiles with 58 parts of 60 percent nonvolatile solution of butylated methylol melamine. The thus coated substrate was baked at 250° F. for 30 minutes. The coating has a pleasing aesthetic appearance, exhibiting superior polychromatic effects and silver "metallic" appearance.

EXAMPLE 2

Using the procedure of Example 1 a base coat pigment composition representing 7.478% pigment in the base coat, comprising 95.00 parts Rutile Titanium Dioxide, 4.50 parts phthalocyanine blue, and 0.50 part carbon black was overcoated with the same transparent topcoat of Example 1. A light-medium blue "metallic" coated substrate resulted. All coatings were applied with a Ransburg turbobell electrostatic sprayer (3 inch diameter, ⅜ inch depth) at a traverse speed of 14 ft/min., 12-14 inch standoff, 30,000 rpm, at a voltage of about 110 Kv.

The compositions and processes according to the present invention provide many improvements over the paint compositions and processes of the prior art. Pearlescent color effects at least equivalent to the use of metallic particles are produced without the need for metal particles and the application and stability problems associated with them. Novel color effects can be produced. Better hiding of surface defects can be produced. Color, hiding, fineness of particle size and reflectance not available with other pearlescent pigments are produced while maintaining the appealing and desirable soft, lustrous appearance characteristic of pearlescent. Blending with organic and/or inorganic pigments (including metal particles) is possible with enhancement of aesthetic effects produced. Weather durable color effects are produced.

The applied compositions are not moisture sensitive, use relatively small particle size, are less sensitive to criticality of applications, maintain color trueness at all angles (face to flop color travel), can withstand the elements (i.e., sun exposure), do not operate with subtractive color effects when mixed with other pigments, allow low bake repair color matching, and resist settling and chemical (e.g., acid rain) attack.

It should be noted that while the compositions of the present invention are particularly adapted for original equipment manufacture coatings for automobiles, one of their advantages is the low bake matching use as refinish compositions as well. Whereas in original equipment manufacture the disclosed cellulose esters and/or wax are typically used, such are not universally required for example in refinish compositons. Also, where the thermosetting polymer embodiments are preferred in the original equipment manufacture, in refinish either low temperature cure thermosetting materials (e.g., 150° to 180° F.) or ambient temperature cure thermosetting or thermoplastic materials are preferred.

A big advantage of the transparent topcoat of the present invention is the extremely low pigment to binder ratio of iron oxide encapsulated mica necessary to produce the improved, unique, aesthetic effects and protective qualities of the present invention. Typical pigment to binder ratios range from about 0.0001 to 0.32 (by weight) and preferably about 0.001. The iron oxide encapsulated mica particles in the topcoat also provide a multiplicity of prismatic variation both due to the presence of the particles in the topcoat and due to the light reflective and refractive properties of the particles themselves, i.e., the individual layers on the mica particles. This also provides exceptional color control not obtainable with traditional systems or metal flakes.

Another advantage of the system according to the present invention is the durability of the coating. The iron oxide encapsulated mica particles are natural ultraviolet light absorbers. This provides protection not only to the polymer base but the organic and inorganic pigments as well. For automobile use this provides extended weathering durability.

The topcoat coating material having a low pigment to binder ratio of iron oxide encapsulated mica pigments does not alter the rheology of the clear coating. This allows application over both poor and excellent rheological base coats with excellent aesthetic qualities resulting. This offers enamel systems with improved rheology over traditional enamels. Furthermore, the iron oxide encapsulated mica pigments in the clear coat provide a reinforcing mechanism for the clear coat to the base coat resulting in a better anchored coating system.

In the method area the highly critical parameters necessary for various coating procedures such as electrostatic spraying required by the use of metal flakes is no longer a problem with the material of the present invention. In addition, the method of the present invention produces greater pump stability in the lengthy paint lines required in most automotive applications. With metal flakes in the paint not only is pump stability a problem but the shearing effect on the metal flake alters the original color.

The paints according to the present invention all have improved heat stability over conventionally used paint and improved chemical resistance over metal particle-containing paints. Another advantage is the volume to weight ratio of solids in the paints with the elimination of metal particles and as mentioned above the low pigment to binder ratios useable with the present invention.

Although this invention has been shown and described with respect to detailed embodiments thereof, it will be understood by those skilled in the art that various changes in form and detail thereof may be made without departing from the spirit and scope of the claimed invention.

I claim:

1. A transparent coating composition particularly adapted for use in automotive coatings consisting essentially of thermoplastic or thermosetting resin containing iron oxide encapsulated mica particles in a particle to weight ratio of about 0.0001 to about 0.32, the iron oxide encapsulation additionally containing about 1% to about 35% titanium dioxide and about 0.1% to about 3.5% chromium hydroxide, based on total weight of the particle, the mica particles being about 5 microns to about 60 microns nominal longitudinal dimension and having a thickness of about 0.25 micron to about 1 micron, the iron oxide encapsulation representing about 10% to about 85% by weight of the total weight of the particle, the composition when used as a transparent topcoat portion of a multicoat coating system producing metallic color effects and stability to the elements.

* * * * *